(12) United States Patent
Baker

(10) Patent No.: US 11,632,027 B2
(45) Date of Patent: Apr. 18, 2023

(54) MAGNETICALLY-DRIVEN GENERATOR AND ANTI-LOCK APPARATUS

(71) Applicant: David Brian Baker, Springfield, MO (US)

(72) Inventor: David Brian Baker, Springfield, MO (US)

( * ) Notice: Subject to any disclaimer, the term of this patent is extended or adjusted under 35 U.S.C. 154(b) by 157 days.

(21) Appl. No.: 17/175,943

(22) Filed: Feb. 15, 2021

(65) Prior Publication Data

US 2021/0257892 A1 Aug. 19, 2021

Related U.S. Application Data

(63) Continuation-in-part of application No. 16/009,855, filed on Jun. 15, 2018, now Pat. No. 10,923,986.

(51) Int. Cl.
*H02K 16/02* (2006.01)
(52) U.S. Cl.
CPC .................................. *H02K 16/02* (2013.01)
(58) Field of Classification Search
CPC ............................. H02K 16/02; H02K 21/225
See application file for complete search history.

(56) References Cited

U.S. PATENT DOCUMENTS

2016/0126806 A1\* 5/2016 Angelis ..................... B61K 9/04
310/67 R
2016/0298538 A1\* 10/2016 Lugg ....................... F02C 3/113

\* cited by examiner

*Primary Examiner* — Emily P Pham
(74) *Attorney, Agent, or Firm* — Dale J. Ream

(57) ABSTRACT

A magnetically-driven electricity-producing generator having an anti-lock assembly generates electricity indicative of a full pulse wave environment while creating a repulsive force that reduces the force necessary to rotate the shaft. The generator includes three rotor assemblies, each having three longitudinally extending rotor magnets oriented such that outwardly facing poles establish a N-S-N pattern that, when passed in proximity to a corresponding coil pack, produces electricity having a full pulse wave form. The magnetic anti-lock device utilizes opposing magnets to reduce the varying force required to rotate the shaft and increases efficiency of the rotating shaft. The magnetic anti-lock device includes at least one inner magnet attached to the rotating shaft and at least one outer magnet fixed in position relative to the rotating shaft. The inner magnet passes the outer magnet each time the shaft rotates creating a repulsive force that reduces the force necessary to rotate the shaft.

24 Claims, 20 Drawing Sheets

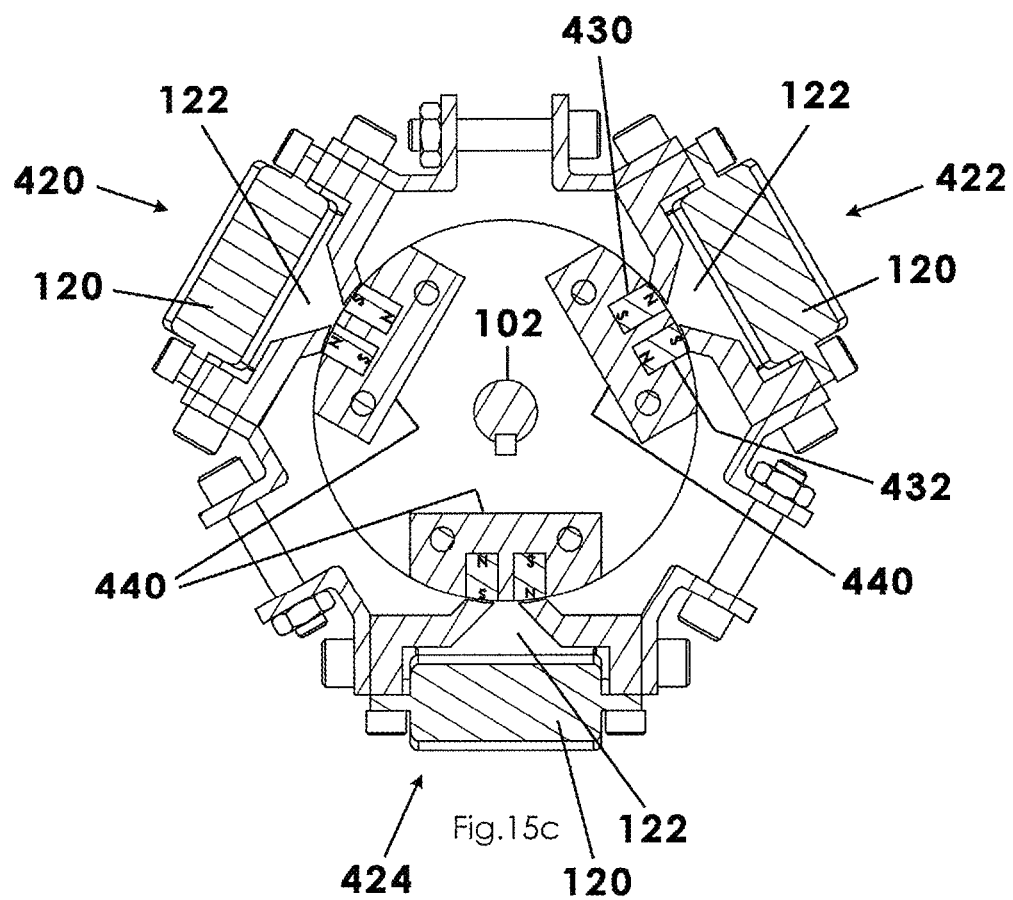

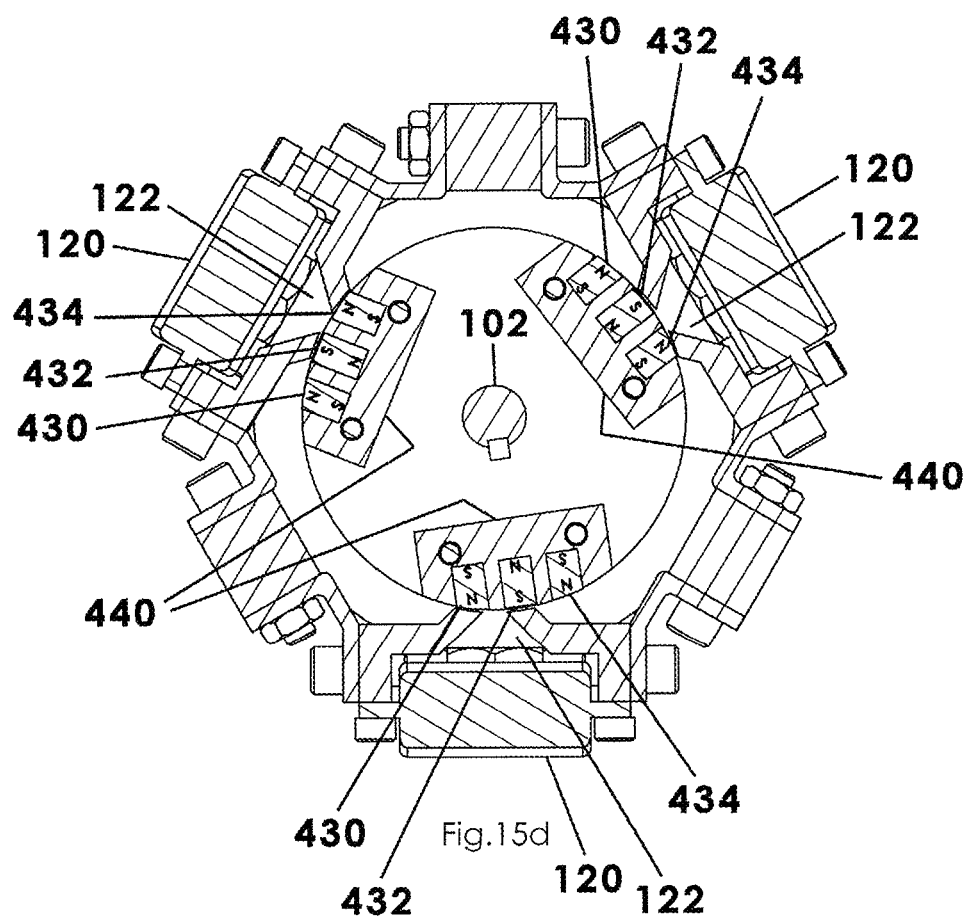

MAGNETICALLY-DRIVEN GENERATOR AND ANTI-LOCK APPARATUS

CROSS-REFERENCE TO RELATED APPLICATIONS

This application claims the benefit of U.S. Non-Provisional patent application Ser. No. 16/009,855 filed Jun. 15, 2018, and titled Magnetic Anti-Lock Device, which claims the benefit of U.S. Provisional Patent Application Ser. No. 62/603,874 filed Jun. 15, 2017 the disclosure of which is incorporated herein in its entirety by reference.

BACKGROUND OF THE INVENTION

This disclosure is in the field of load devices having rotating shafts and, more particularly, for a magnetically driven electricity generating device having an anti-lock device assembly.

In some applications, a shaft is rotated to drive a piece of equipment such as magneto, a generator, or other similar devices. The devices driven by the rotating shaft may generate a variable resistance or workload as the shaft is rotated to drive the device. As the force required to turn the shaft varies, the shaft may become deadlocked or become very difficult to rotate due to the varying force required to do so. This may be especially noticeable at low rates of rotation.

For example, a magneto may be used to generate voltage to operate a spark plug in a small motor. The force required to turn the magneto may vary depending on the relative position of the magnets in the magneto and the coils with which the magnets interact to generate electricity. Once the motor is operating and the flywheel component of the magneto is spinning, the variable force required for the magneto to turn may be acceptable. However, during a pull-start of the motor, a user may have difficulty operating the pull-start due to the varying high resistance of turning the magneto. Even during normal operation, the varying resistance and resistive force reduces efficiency during normal operation of the devices.

Therefore, it would be desirable to have a magnetically-driven electricity generator having an anti-lock device that overcomes the condition of shaft deadlock which may occur due to variable resistance or workload as the shaft is rotated to drive the device. Further, it would be desirable to have a magnetically-driven generator having an anti-lock device in which each rotor assembly includes three rotor magnets specifically oriented such that a full pulse waveform of electricity is produced when the three rotor magnets pass respective coil members of the generator. In addition, the magnetic anti-lock device described herein counteracts some of the variable force required to turn the generator and thus makes the device more efficient and easier for use in some situations such as a pull-start motor.

SUMMARY OF THE INVENTION

In the co-pending non-provisional application referenced above and from which the present application depends, a magnetic anti-lock device was disclosed for use with a rotating shaft or, more specifically, with devices that incorporate a rotating shaft, such as a magneto, an electricity generator, or other similar load device. In the present disclosure (filed as a continuation-in-part application), specific attention is given to a magnetically driven electricity generator in use with or even incorporating the magnetic anti-lock device disclosed previously. For the sake of clarity and because the magnetically-driven electricity-producing generator apparatus disclosed herein includes the anti-lock device disclosed previously, the full disclosure of the anti-lock device is set forth again along with FIGS. 1-10 which illustrate it. Then, a detailed description of a preferred embodiment of the rotor assemblies of the generator along with corresponding illustrations will be included.

In various embodiments, the invention described herein comprises an anti-lock device for a rotating shaft with at least one inner magnet attached to the rotating shaft, and at least one outer magnet held in a fixed position relative to the rotating shaft. The poles of the inner magnets and the outer magnets are positioned so that when each of the inner magnets passes by each of the outer magnets on each revolution of the rotating shaft a repulsive force exists between the each of the inner magnets and each of the outer magnet.

In some embodiments, the anti-lock device has at least three inner magnets and has at least three outer magnets. In some embodiments, the anti-lock device may also be provided with an inner ring fixed to the rotating shaft to which the inner magnets are attached.

In some embodiments, the anti-lock device of also has an outer ring having a socket for receiving the outer magnets. In some embodiments, each of the outer magnets is adjustably attached to the outer ring to allow the separation between each of the inner magnets and the outer magnets to be adjusted. In preferred embodiments, the inner end of each of the outer magnets includes a tapered section. One embodiment of the tapered section is a frustoconical section. Another embodiment of tapered section is opposed bevels aligned with the direction of rotation of the at least one inner magnets.

In embodiments, the positions of the inner magnets and the magnets are selected so that each of the inner magnets is repelled by the outer magnets when the variable rotational resistance of the load device is at an increased resistance.

In some embodiments, the socket is a threaded socket and each of the outer magnets is disposed in a threaded member received by one of the threaded sockets.

In additional embodiments, the separation between the inner magnets and the outer magnets may be adjusted by turning the threaded member to advance or retract the threaded member from the threaded socket.

In an additional embodiment, the anti-lock device (also referred to as an anti-lock assembly) is used with a rotating shaft used to power a load device (such as the magnetically-driven generator disclose herein), the anti-lock device comprising an inner ring attached to the rotating shaft such that the inner ring rotates with the shaft, a first inner magnet, a second inner magnet, and a third inner magnet attached to the inner ring, a second ring attached to the load device in a fixed relationship to the rotating shaft, a first outer magnet, a second outer magnet, and a third outer magnet attached to the outer ring. When the inner ring rotates with the rotating shaft, the like magnetic poles of each of the outer magnets exerts a repulsive force on each of the inner magnets as the inner magnets pass by the outer magnets. The like magnetic poles of the inner magnets and the outer magnets extend outwardly from the inner ring and inwardly from the outer ring, respectively.

In some embodiments, the inner magnets are disposed on the inner ring with their like poles extending outwardly from the shaft and with 120 degrees of arc separation from the other inner magnets. Similarly, in some embodiments, the outer magnets are disposed on the outer ring with their like poles extending inwardly toward the shaft and with 120 degrees of arc separation from the other outer magnets.

In the various embodiments, the outer magnets are aligned with the load device such that when one of the outer magnets repels one of the inner magnets, the repulsive force counteracts a portion of the load of the load device, i.e., overcomes a deadlock condition.

BRIEF DESCRIPTION OF THE DRAWINGS

FIG. 13b is an isolated view on an enlarged scale taken from FIG. 13a.

FIG. 14a is an exploded view of the inner rotor assembly module shown in FIG. 13a;

FIG. 14b is an isolated view on an enlarged scale taken from FIG. 14a.

FIG. 15a is a side view of the inner rotor assembly module of FIG. 13a;

FIG. 15b is a sectional view taken along line 15b-15b from FIG. 15a.

FIG. 15c is a sectional view taken along line 15c-15c from FIG. 15a, illustrated in an embodiment having only two inner rotor magnets.

FIG. 15d is a sectional view taken along line 15c-15c from FIG. 15a, illustrated in an embodiment having three inner rotor magnets.

DESCRIPTION OF THE PREFERRED EMBODIMENT

A magnetically-driven electricity generator having an anti-lock device will now be described in detail with reference to the accompanying figures. First, the anti-lock device 100 for use with the generator 108 will be described in detail with specific reference to FIGS. 1 to 10.

The magnetic anti-lock device 100 does not replace traditional bearings and bushings but helps overcome periodic resistance during the rotation of shaft 102 that might cause it to slow or stop altogether. Some load devices that are operated by a rotating shaft, such as a magneto or a generator, generate variable resistance to the rotation of the rotating drive shaft. This variable resistance may be due to the interaction of the internal components of the load device, such as interaction of the coil and magnets in a generator, or the armature, coils, and magnets in a magneto.

The locations of maximum resistance to rotation of the drive shaft may be determined based on the internal configuration of the load device, or simply be measuring the torque required to cause the rotating shaft to rotate and operate the load device. The anti-lock device described herein is aligned to the variable resistance of the load device to overcome some of the resistance of the load device at those maximum points by using repulsive magnetic forces.

As described in more detail below, the anti-lock device comprises inner magnets that are attached to and spin with the rotating shaft and outer magnets that are fixed in relation to the rotating shaft. Each one of the inner magnets passes close to each of the outer magnets once during each revolution of the rotating shaft. The poles of the inner and outer magnets are oriented such that as the two magnets pass close to each other, they repel one another. The points of repulsive force from the inner and outer magnets are timed (via the positioning of the magnets with respect to the variable resistance of the load device) to coincide with the maximum resistance of the load device and to counteract a portion of the resistance of the load device.

The anti-lock device thus reduces the force required to rotate the shaft through the variable resistance of the load device. This prevents locking, and reduces the maximum power requirements for motors used to drive the load device by smoothing the overall resistance of the load device to rotation.

Figure 1:
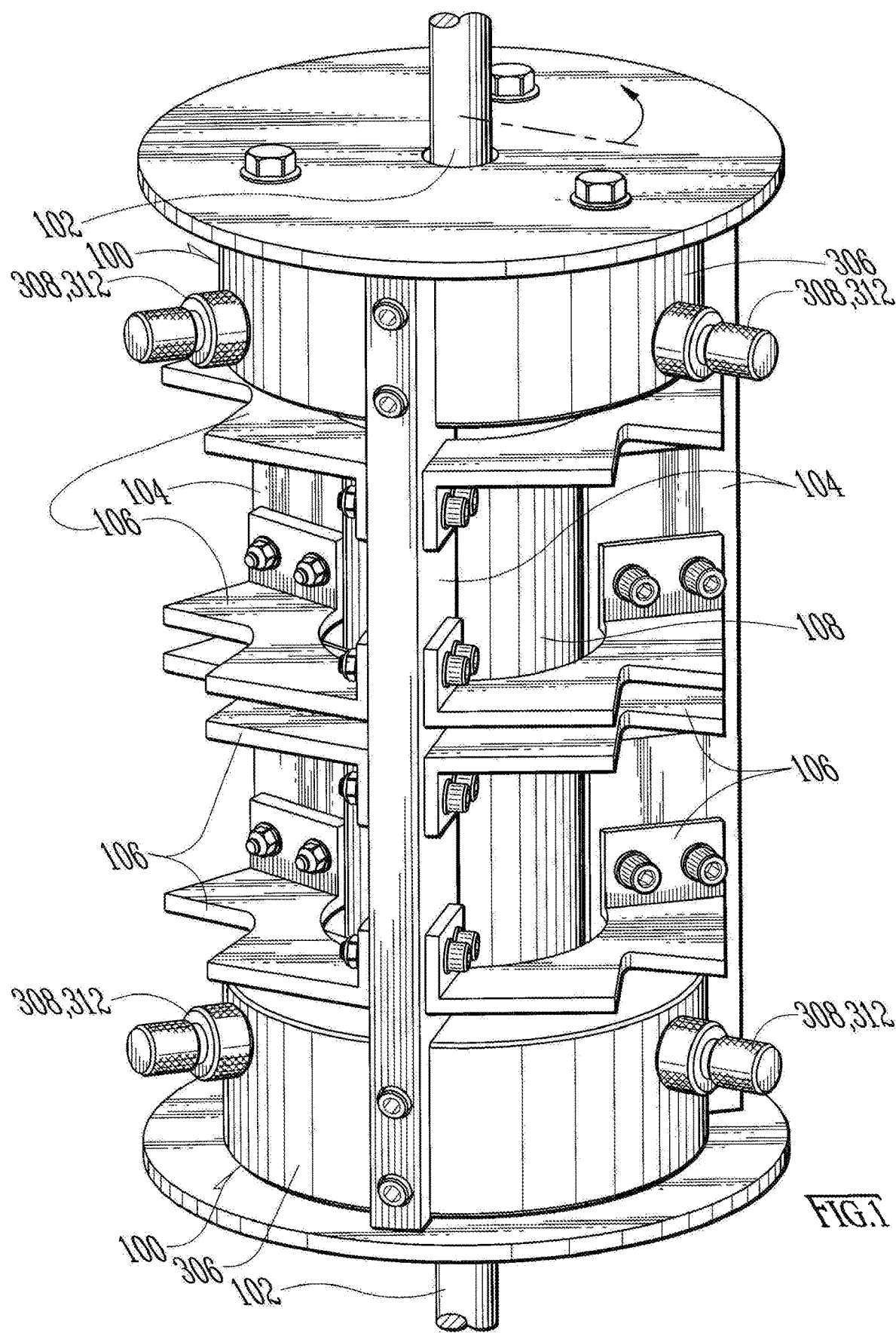
FIG. 1 is a perspective view of a device incorporating an embodiment of the inventive anti-lock device.
Figure 2:
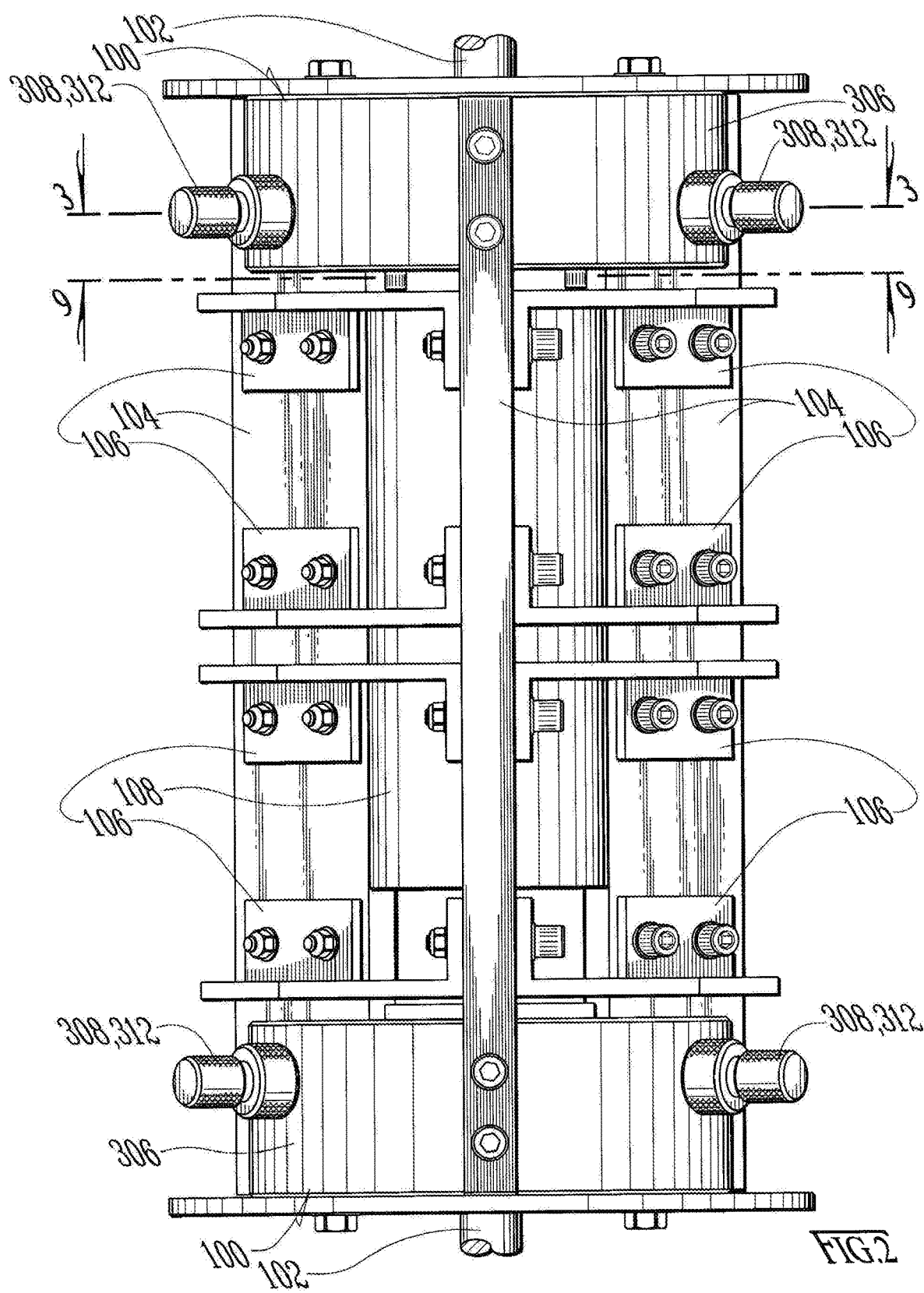
FIG. 2 is a side view of device incorporating an embodiment of the inventive anti-lock device.

Referring now to FIGS. 1 and 2, a perspective and a side view, respectively, of a device incorporating the inventive anti-lock device are depicted. The depicted anti-lock devices 100 are shown for use reducing rotational resistance for a rotating shaft 102. In the depictions in FIGS. 1 and 2, two of the magnetic anti-lock devices 100 are shown in use supporting the shaft 102 (i.e., at opposite ends).

In some applications a single magnetic anti-lock device 100 may be used with a shaft, or more than two magnetic anti-lock devices 100 may be used on the same shaft. The magnetic anti-lock devices 100 are supported by a structural frame that may vary from application to application and whose details are not limiting of the inventive device. In the depicted embodiments, the structure comprises plate members and beam members 104 to which the devices 100 are attached, and additional rib members 106 to provide additional support to the beam members 104. The depicted details of the plate, beam and rib members are not limiting of the claimed invention. Further, the plate members, beam members 104, and rib members 106 may be referred to generally as a framework 101 to which a load device such as a magnetically-driven electricity generator 108 may be coupled, as will be described in detail later.

There may be traditional bearings or bushings securing shaft 102 within the structure and in relationship to the magnetic anti-lock device 100. In addition, a generator, motor, or other device 108 may be attached to the shaft 102 to power or to be powered by the rotation of shaft 102.

Figure 3:
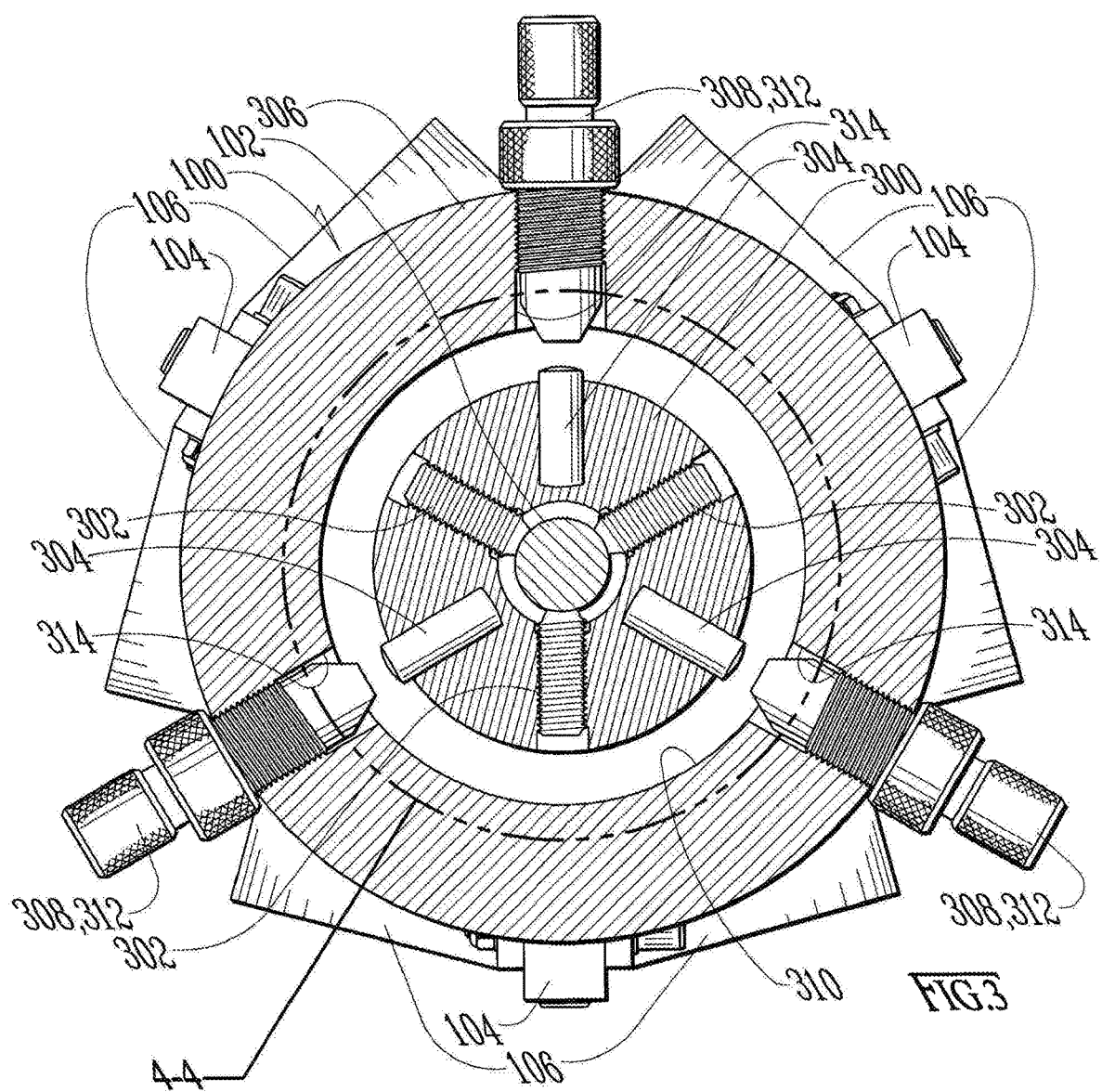
FIG. 3 is a cross-sectional view of an embodiment of the inventive anti-lock device.
Figure 4:
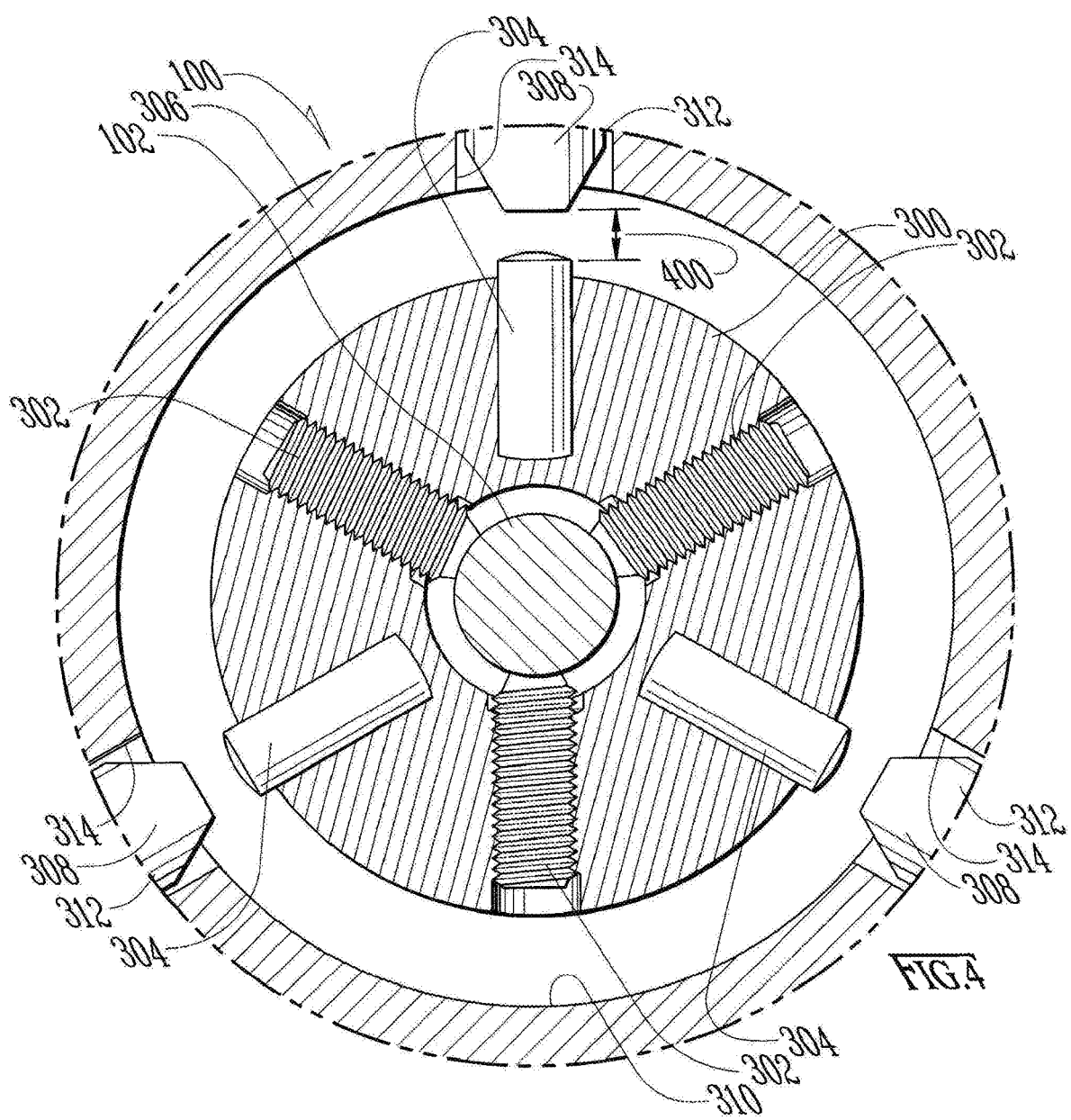
FIG. 4 is a detail cross-sectional view of a portion of an embodiment of the inventive anti-lock device.

Referring now to FIG. 3, a cross-sectional view of the inventive device 100 is depicted along the axis labeled as 3-3 on FIG. 2. FIG. 4 depicts a cross-sectional view of the portion of FIG. 3 in the dashed circle. Inner ring 300 is an annular ring provided for attachment to shaft 102. In the depicted embodiment, inner ring 300 is attached to shaft 102 by set screws 103. The use of three set screws allows the inner ring 300 to be securely fastened to shaft 102 with fine adjustment control to center and balance the shaft 102 within the inner ring 300. In some embodiments, the inner ring may be welded to the shaft, provided with a key to match a keyway in the shaft or vice versa, or attached in some other manner to the shaft. In some embodiments the inner ring 300 may be formed integrally with shaft 102. The inner ring 300 extends outwardly (i.e., radially) from the rotational axis of shaft 102.

The width of its outward extension may vary in embodiments of the invention, but must be sufficient to receive and secure at least one inner magnet members 304 in a desired relationship to outer ring 306. As shaft 102 rotates, inner ring 300 also rotates at the same rate. The depicted embodiment incorporates three inner magnets 304, but in other embodiments, more or fewer inner magnets 304 may be provided. In some embodiments the outward extension of the annular ring may not be uniform around the perimeter of the ring, but may vary as necessary for the components attached to it. The inner magnets are typically distributed around the inner ring in an equal manner to equally distribute the weight and rotationally balance the inner ring 300 on the shaft 102. In the embodiment with three inner magnets, each of the three inner magnets is aligned with a ray extending outwardly from the center of the rotating shaft with 120 degrees of arc separating each magnet alignment with those of the other two magnets. In some embodiments the inner magnets have a pulling power of 65 lbs., though various embodiments may have different pulling power. Each inner magnet may consist of multiple smaller magnets placed together with opposite poles together.

An outer structural member is provided to support additional outer magnets 308. In the depicted embodiment, the outer structural member 306 is an annular ring that is fixedly attached to the structure to which the magnetic anti-lock device 100 is attached (i.e., the framework described above with reference to elements 104 and 106). At least one outer magnet 308 is provided in the outer ring 306. The outer magnets 308 are secured to the outer ring 308 so that one pole of the outer magnet extends inwardly from the inner surface 310 of the outer ring 308 toward the inner ring 300. The function of the outer ring 306 is to provide support to the outer magnets 308 in relation to the inner magnets 304.

In some embodiments of the device 100, the outer ring 306 may not be a solid ring but may have gaps, be formed from separate pieces affixed together, or include only sufficient portions as necessary to support the magnets 308 at the desired location and with the desired rigidity. In some embodiments, the magnets 308 might not be supported by a ring 306 but by a support structure of sufficient rigidity. Any such structure that supports magnets 308 at the necessary locations with respect to the inner magnets 304 may be an embodiment of the inventive device.

In the depicted embodiment, outer magnets 308 are attached to a member 312 which is received by a hole or socket 314 in outer ring 306. The outer magnets 308 may be affixed to the end of member 312 by glue or other means of attachment. In some embodiments, magnets 308 may be recessed into cavities in the end of member 312.

The outer magnets are typically distributed around the outer ring as necessary to cause the magnetic interactions between the inner and outer magnets to occur at the desired point in the rotation of the shaft. In the depicted embodiment with three outer magnets, each of the three outer magnets is aligned with a ray extending outwardly from the center of the rotating shaft with 120 degrees of arc separating each magnet alignment with those of the other two magnets. In some embodiments of the device, additional outer magnets may be distributed around the outer ring as necessary to match the load characteristics of the shaft rotation. In some embodiments two additional outer magnets, equally spaced apart, may be disposed between the three outer magnets shown in the figures.

Figure 5:
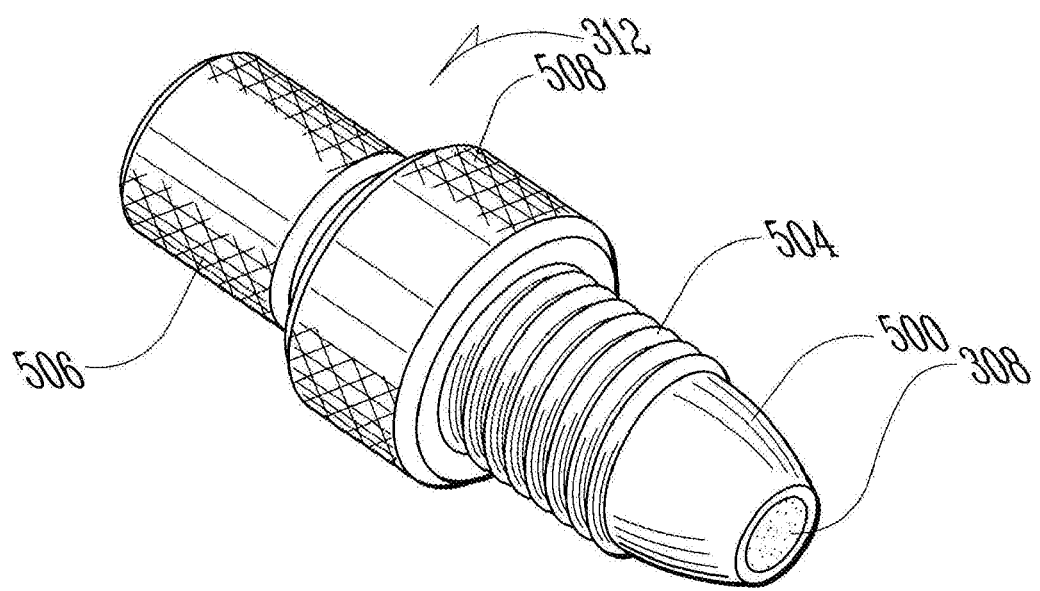
FIG. 5 is a perspective view of an embodiment of a portion of the inventive antilock device.

In some embodiments of the device, the outer magnets have from 130 to 195 lbs. of pulling power. In some embodiments, not all of the outer magnets have the same pulling power. In some embodiments, the two additional magnets may have half of the pulling power of the three outer magnets shown in the figures. The outer magnets may each be formed from smaller magnets placed with opposite poles together to form one larger magnet. In some embodiments of the member 312 the magnet is shaped to improve performance by creating a desired magnetic field. Referring now to FIG. 5 a perspective view of an embodiment of the member 312 is depicted. In this embodiment, the inner end of the magnet 308 tapers as it approaches the inner end of the member 312. The tapered section of magnet 308 may be shaped in a variety of shapes to create a desired magnetic field that gradually increases the repulsive force between the two magnets. Without the tapered section, an abrupt increase in magnetic repulsion between the inner and outer magnets that would reduce the functionality of the anti-lock device. In the first depicted embodiment, the magnet 308 has a frusto-conical section 500 that provides the taper but has a flat circular end surface 502.

Grip portion 506 allows a user to adjust the position of the magnet 308 in relation to magnet 304 by turning the member 312 and advancing or retracting it in the socket 314 in outer ring 306. A locking ring or nut 508 may be provided for locking the member 312 in place when it is adjusted to a desired position. The locking ring 508 may be rotated on the threads 504 until it is secured against the outer surface of outer ring 306, thus locking member 312 in place with respect to outer ring 306. The member is also provided with screws 504 for engaging the threads in the socket 314 in outer ring 306.

Figure 6:
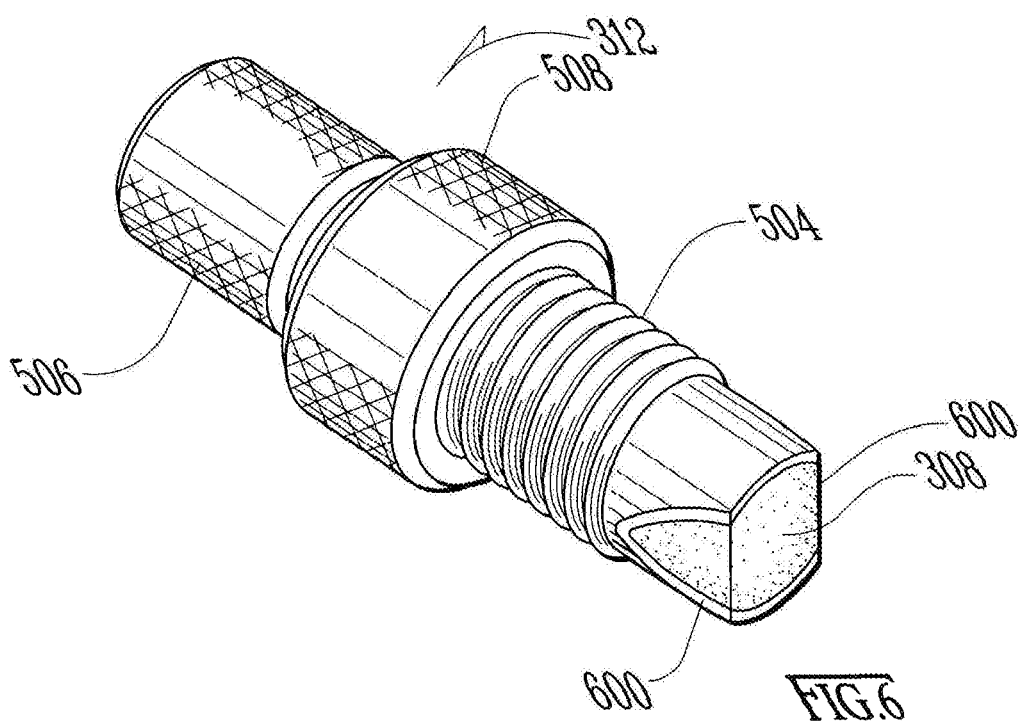
FIG. 6 is a perspective view of an embodiment of a portion of the inventive antilock device.

In another embodiment of member 312 depicted in FIG. 6, the magnet 308 has two bevels 600 disposed on opposite sides of magnet 308. The opposed bevels also serve to shape the magnetic field created by magnet 308 into a desired shape. In this embodiment, an indicium of the location of the bevels is provided on grip 506 so that a user may align the bevels 600 with the direction of rotation of the inner magnets 304 when it is disposed into socket 314.

In the depicted embodiment, member 312 is a threaded bolt. In other embodiments, member 312 may not be a bolt or cylindrical, but may be other shapes within the scope of the inventive device. In the depicted embodiment, hold 314 is threaded to receive threads on bolt 312. In embodiments with the threaded hole and bolt, the bolt 312 may be advanced into the hole to adjust the separation or gap 400 between inner magnets 304 and outer magnets 308. The threading also allows the adjustment of the orientation of the outer magnet 308 with respect to the rotation of the inner ring 300.

As shaft 102 rotates due to the operation of the load device 108 (e.g., a generator) or other part of the system, the inner ring 300 will rotate, causing inner magnets 304 to pass in close proximity to outer magnets 310. The magnets 304 and 310 are oriented so that the like poles of each magnet will come into close proximity thus causing the outer magnets 308 to repel the inner magnets 304, and vice versa.

Figure 7:
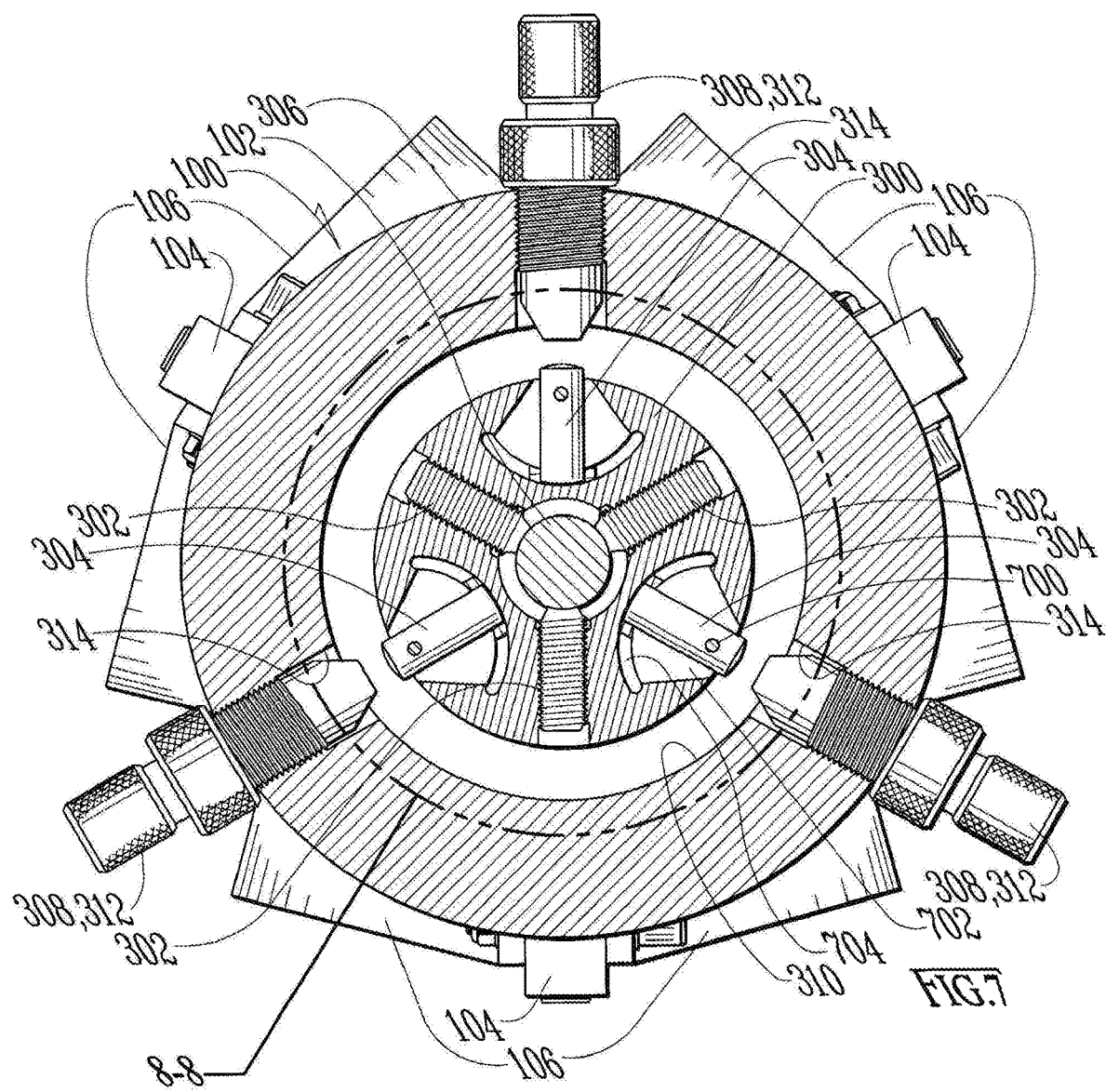
FIG. 7 is a cross-sectional view of an alternative embodiment of the inventive anti-lock device.
Figure 8:
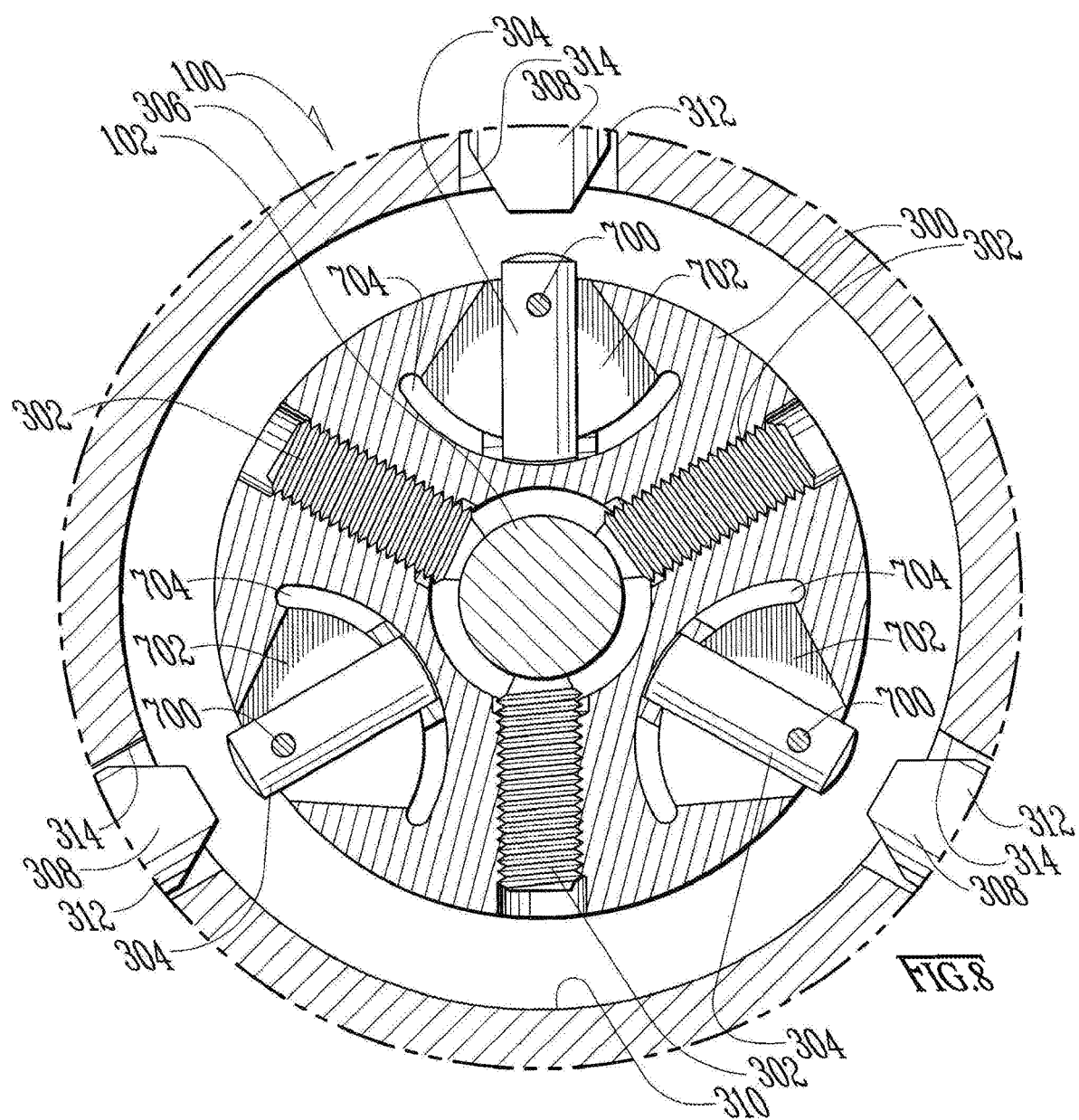
FIG. 8 is a cross-sectional view of a portion of an alternative embodiment of the inventive anti-lock device.
Figure 9:
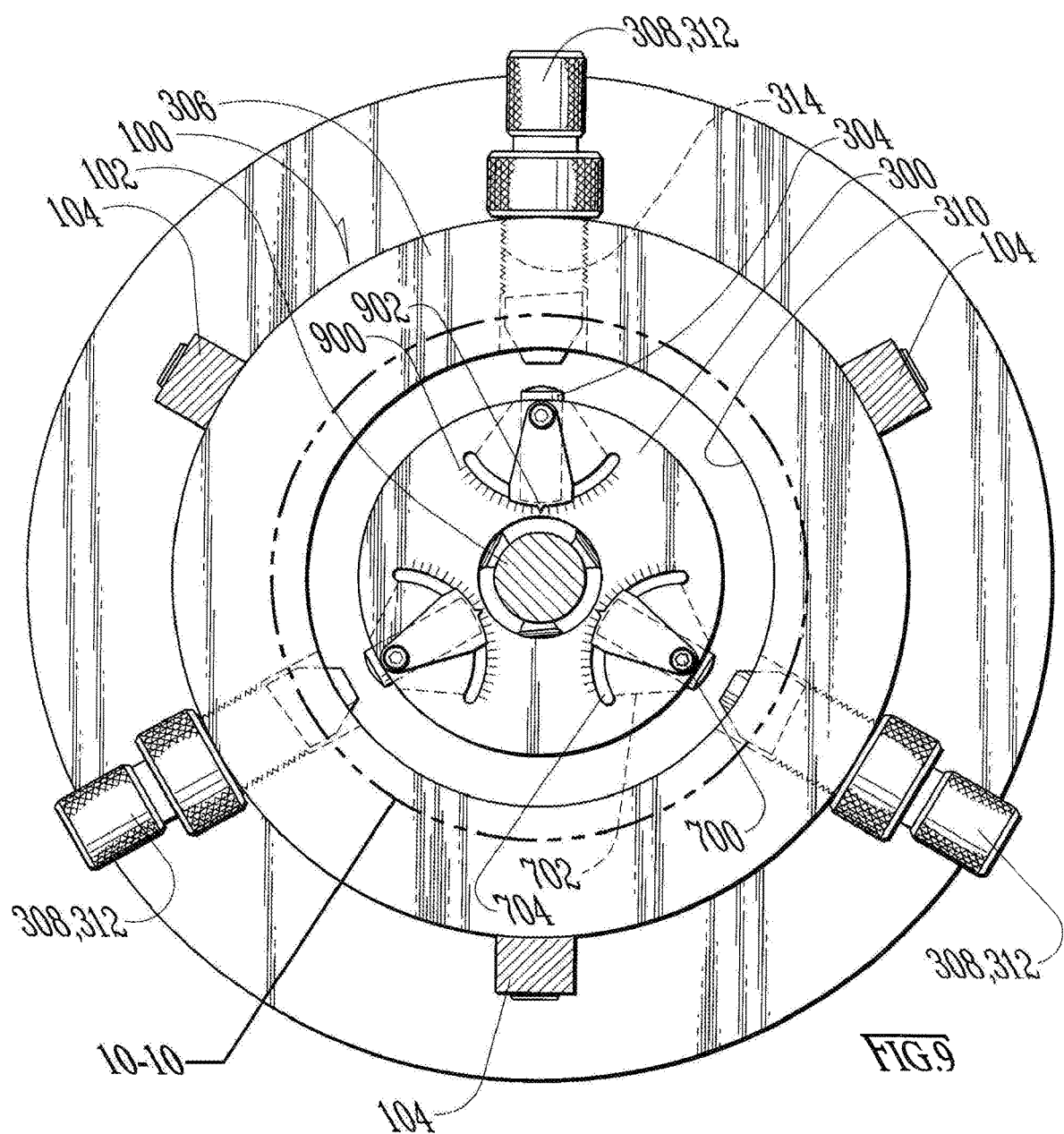
FIG. 9 is a cross-sectional view of an alternative embodiment of the inventive anti-lock device.
Figure 10:
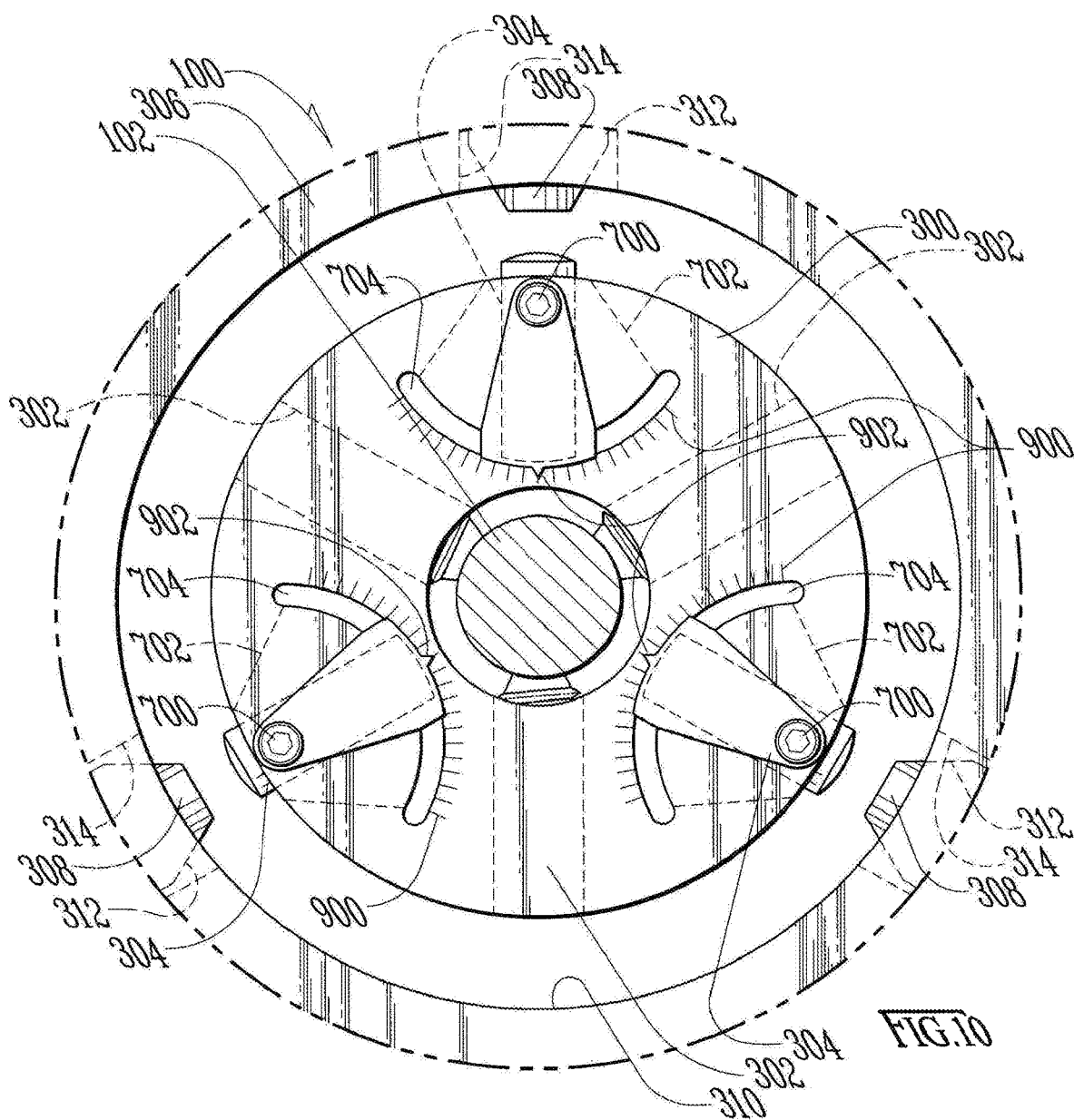
FIG. 10 is a cross-sectional view of a portion of an alternative embodiment of the inventive anti-lock device.
Figure 11:
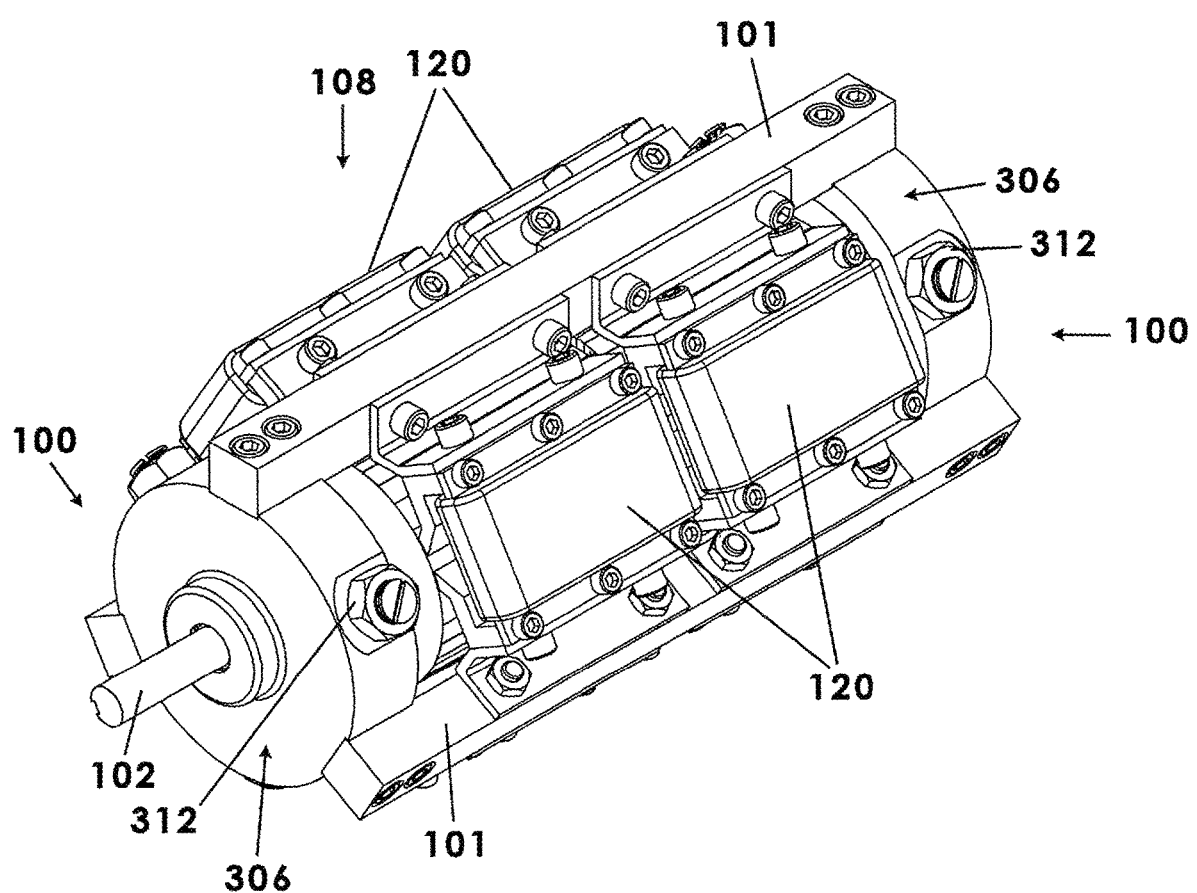
FIG. 11 is a perspective view of a magnetically-driven electricity generator according to a preferred embodiment of the present invention.

Referring now to FIGS. 7 and 8, cross-sectional views of an alternative embodiment are depicted. The alternative embodiment is similar to the previously described embodiment, with the additional of a means of adjustment of the inner magnets 304. In this embodiment, inner magnets 304 are pivotally attached to the inner ring 300 by a pin 700. The chamber 702 in which the inner magnets 304 are disposed have arcuate inner surfaces 704 to allow the inner magnets 704 to pivot around pin 700. FIGS. 9 and 10 depict an embodiment of adjustment scales 900 that may be used to adjust the angle of inner magnets 304 with respect to the inner ring 300. The indicator 902 moves in alignment with inner magnet 304 to indicate the alignment of magnet 302 to the user of the device 100.

Now, a more specific embodiment of the present invention will be described with reference to FIGS. 11 to 17 and is substantially similar in construction to the embodiments described above except as specifically noted below. Even more specifically, a detailed disclosure is made of the load device 108 mentioned earlier, the load device 108 being a magnetically-driven electricity-producing generator. Reference numerals will remain the same as disclosed above unless terminology of components and changed structures are specifically noted below.

An electrical generator is a device that may be operatively used in association with the rotating shaft 102. In an embodiment, the generator 108 may include a plurality of coil packs 120 and related components may be coupled to the framework elements 104 and 106 described above. Each coil pack 120 includes a plurality of wires arranged in a coil or wrapped configuration referred to as windings. It is understood that rotation of magnets in close proximity to windings or coils will generate electrical current and such functionality is apparent in this embodiment and is measurable as will be described below. The quantity and orientation of magnets associated with and proximate to each coil pack 120 is critical to the character, efficiency, and quantity of electricity that is generated upon each rotation of a core of the generator. It is understood that each set of rotor magnets is positioned a fixed distance from corresponding coil packs 120 and that this distance is adjustable. It will be understood that the load device and electricity-producing generator may be used synonymously hereafter and referenced with number 108.

Figure 12:
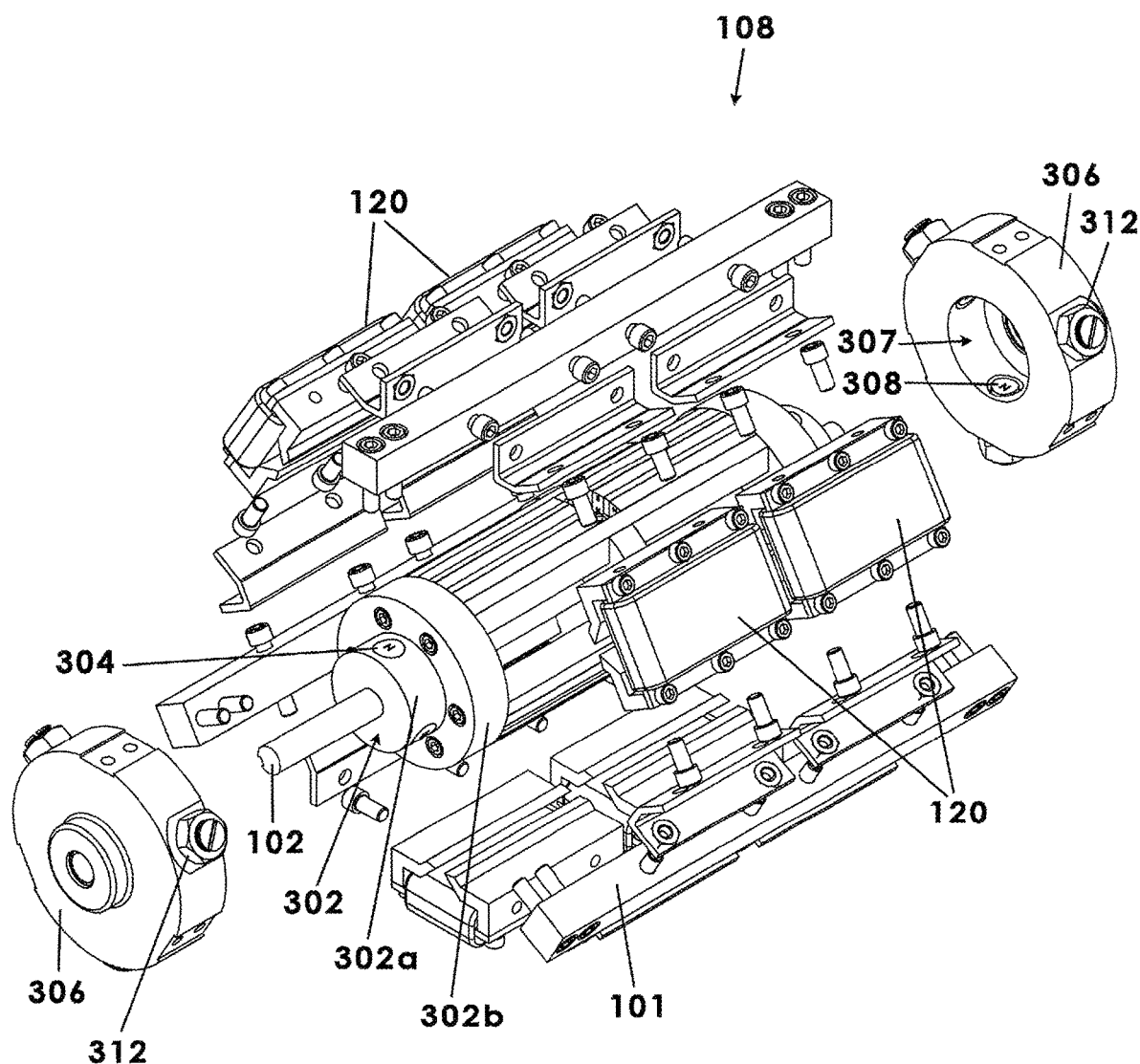
FIG. 12 is an exploded view of the electricity generator as in FIG. 11.
Figure 13A:
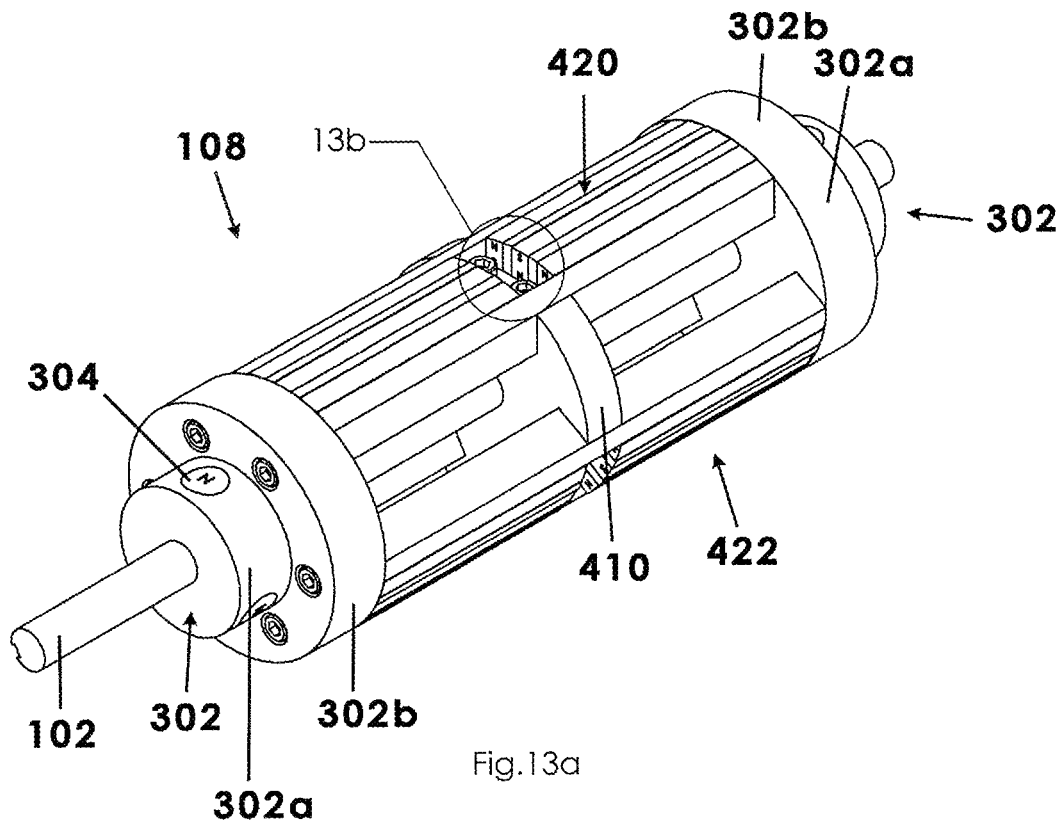
FIG. 13a is a perspective view of the inner rotor assembly module of the electric generator removed from the apparatus illustrated in FIG. 1.
Figure 13B:
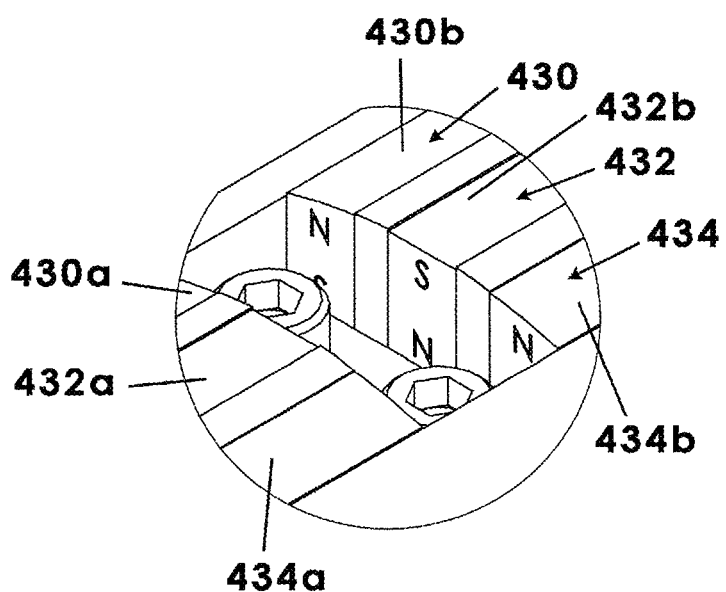

The structure of the generator as the load device is best described with reference to FIG. 12 which is an exploded view of the apparatus. Specifically, the pair of outer rings 306 are exploded outwardly to reveal the detailed disclosure of the generator load device 108. Further, FIG. 12 shows the inner rings 300 displaced from corresponding outer rings 306 and coupled to end support rings 302b of the generator. It will be understood that each outer ring 306 defines a main bore 307 having a diameter sufficiently large to receive a corresponding inner ring 302 therein in a nested and rotational arrangement relative thereto (for functioning of the anti-lock device described above). In an embodiment, each inner ring 302 may include includes a magnet portion 302a (i.e., a smaller-diameter ring) rotatably coupled to each said outer ring, respectively, and an end support ring 302b attached to an associated inner rotor assembly, respectively.

Stated another way, the magnet portion 302a is the link to the outer ring 306 and anti-lock device 100 and the end support ring 302b is the link to the generator 108 or, more particularly, to the inner rotor assemblies described below in more detail.

In an embodiment, the magnetically-driven generator (as the load device 108) includes a number of inner rotor assemblies that rotate with the rotating shaft 102 that is equal to the number of coil packs 120. In this embodiment, there are three sets of coil packs 120 coupled to the framework 104 and 106 and having an arc separation of 120 degrees relative to one another. Accordingly, the generator also includes first, second, and third inner rotor assemblies 420, 422, 424 also spaced apart from one another by a 120 degrees arc separation. Description of the rotor assemblies 420, 422, 424 will be accomplished with reference to a single rotor assembly or to the first rotor assembly 420 as the three assemblies are identical.

The pair of end support rings 302b are positioned and displaced from one another and are positioned, respectively, at opposing ends of the rotor assemblies. Each end support ring 302b defines a bore through which the rotating shaft 102 extends, it being understood that each end support ring 302b is attached to the rotating shaft 102 so as to rotate when the rotating shaft 102 rotates or, similarly, to cause the rotating shaft 102 to rotate. Further, a center support ring 410 is positioned intermediate the end support rings 302b and is parallel to the end support rings 302b, defines a bore through which the rotating shaft 102 extends and is attached thereto. In other words, the end support rings 302b and center support ring 410 are configured to rotate when the rotating shaft 102 rotates and, in an embodiment, when the inner ring 302 rotates magnetically relative to the outer ring 306.

Figure 14A:
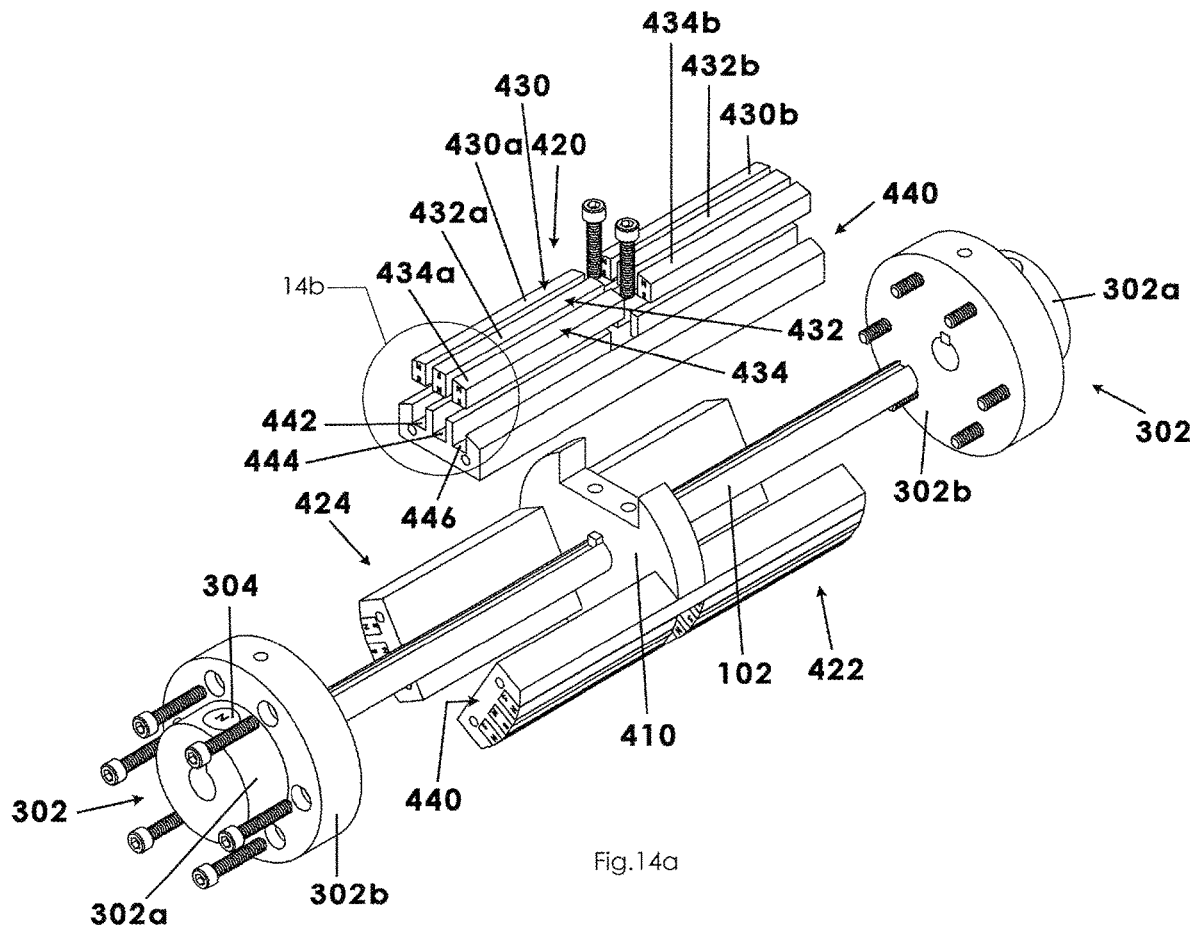
Figure 14B:
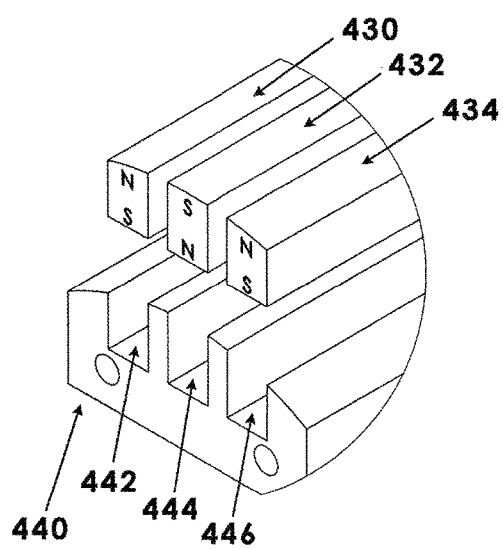

In an embodiment, each inner rotor assembly includes a first rotor magnet 430, a second rotor magnet 432, and a third rotor magnet 434, each rotor magnet having an elongate configuration extending longitudinally between the opposed pair of end support rings 302b, respectively. Preferably, each rotor assembly includes a magnet holding member 440 that defines a number of slots equal to the number of rotor magnets that are included in the embodiment of the present invention. In the preferred embodiment, for instance, the magnet holding member 440 defines a first slot 442 having a linear and longitudinally extending configuration for receiving the first rotor magnet 430. Similarly, the magnet holding member 440 defines a second slot 444 having a linear and longitudinally extending configuration for receiving the second rotor magnet 432. Also, the magnet holding member 440 defines a third slot 446 having a linear and longitudinally extending configuration for receiving the third rotor magnet 434. For the sake of clarity, only one magnet holding member 440 receiving the first, second, and third rotor magnets 430, 432, 434 is illustrated in FIG. 14a, it being understood that a second magnet holding member and a third magnet holding member have an identical construction. Stated another way, an embodiment of the present invention includes three magnet holding members each configured to receive three longitudinally extending rotor magnets. As shown, each magnet holding member 440 (and each set of three rotor magnets) may be coupled to at least one end support ring 302b and is rotatable when the rotating shaft 102 is rotated.

In a critical aspect, the orientation of each set of three rotor magnets will result in a predetermined waveform of electricity being induced as respective rotor magnets pass by respective coil packs 120. In a preferred embodiment, the outwardly facing poles of the first rotor magnet 430 and third rotor magnet 434 have the same polarity—for example, a North (N) polarity. In this embodiment, it is preferred that the second rotor magnet 432, which is positioned intermediate the first rotor magnet 430 and third rotor magnet 434, has an outwardly facing pole having a polarity that is opposite that of respective poles of the first rotor magnet 430 and third rotor magnet 434. In other words, the polarity pattern of outwardly facing poles of the three rotor magnets of a respective rotor assembly is N-S-N.

Figure 16A:
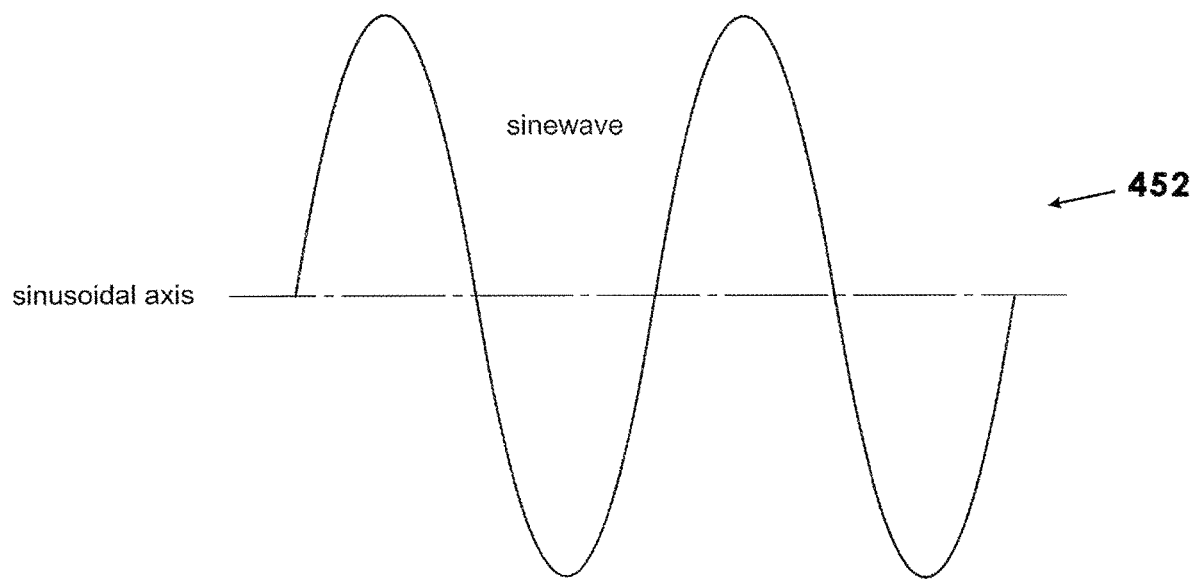
FIG. 16a is a diagrammatic view of a sine wave indicative of a full pulse wave.
Figure 16B:
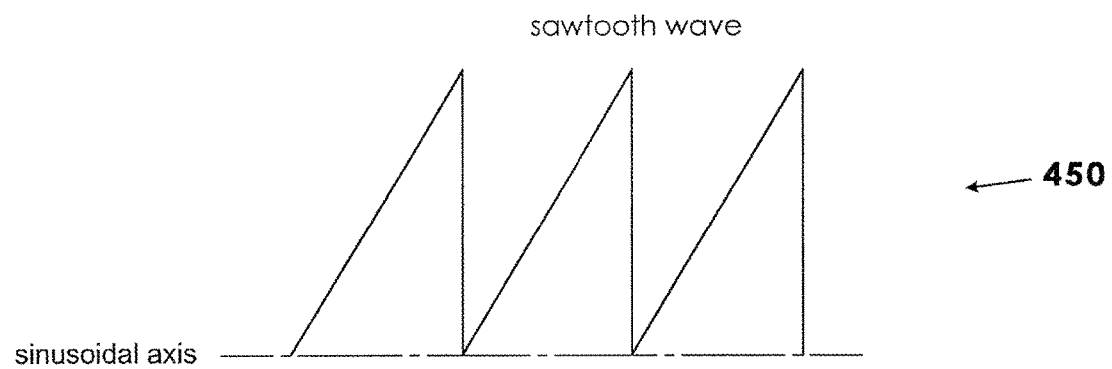
FIG. 16b is a diagrammatic view of a sawtooth wave indicative of a half pulse wave.

As will be discussed, this configuration of polarities induces a first half-pulse wave of electricity followed by a second half-pulse wave of electricity on every pass/rotation of a set of rotor magnets past a respective coil pack 120. More particularly, the first and second rotor magnets 430, 432 include outwardly facing poles of opposite polarities that induce a half-pulse wave of electricity as they pass by a corresponding coil pack. It will be understood that a pass of the set of rotor magnets past a coil pack 120 will flip the polarities of the magnets. Similarly, the second and third rotor magnets 432, 434 also include outwardly facing poles of opposite polarities that induce a half-pulse wave of electricity as they pass by a corresponding coil pack. This past will also flip the polarities. Together, a full pulse wave of electricity is generated upon each pass (rotation) of a group of three rotor magnets oriented as described above. A full pulse wave of electricity is stable and efficient whereas a half-pulse wave of electricity is unstable, erratic, and inefficient. It is understood that in testing and in operation, a wire may extend from the narrow gap 122 between a set of rotor magnets and a corresponding coil 120 connection to an oscilloscope for purposes of analyzing a generated or induced electrical signal. Consistent with the description above, electrical current characterized by a half-pulse wave (produced by a pair of rotor magnets having opposite polarities passing a corresponding coil pack 120 produces a sawtooth waveform 450 when analyzed on an oscilloscope, as shown in FIG. 16b. By contrast, electrical current characterized by a full pulse waveform (produced by three adjacent rotor magnets having a N-S-N polarity pattern produces a smooth sine waveform 452 on the oscilloscope and is indicative of smooth and stable power source (FIG. 16a).

Figure 15A:
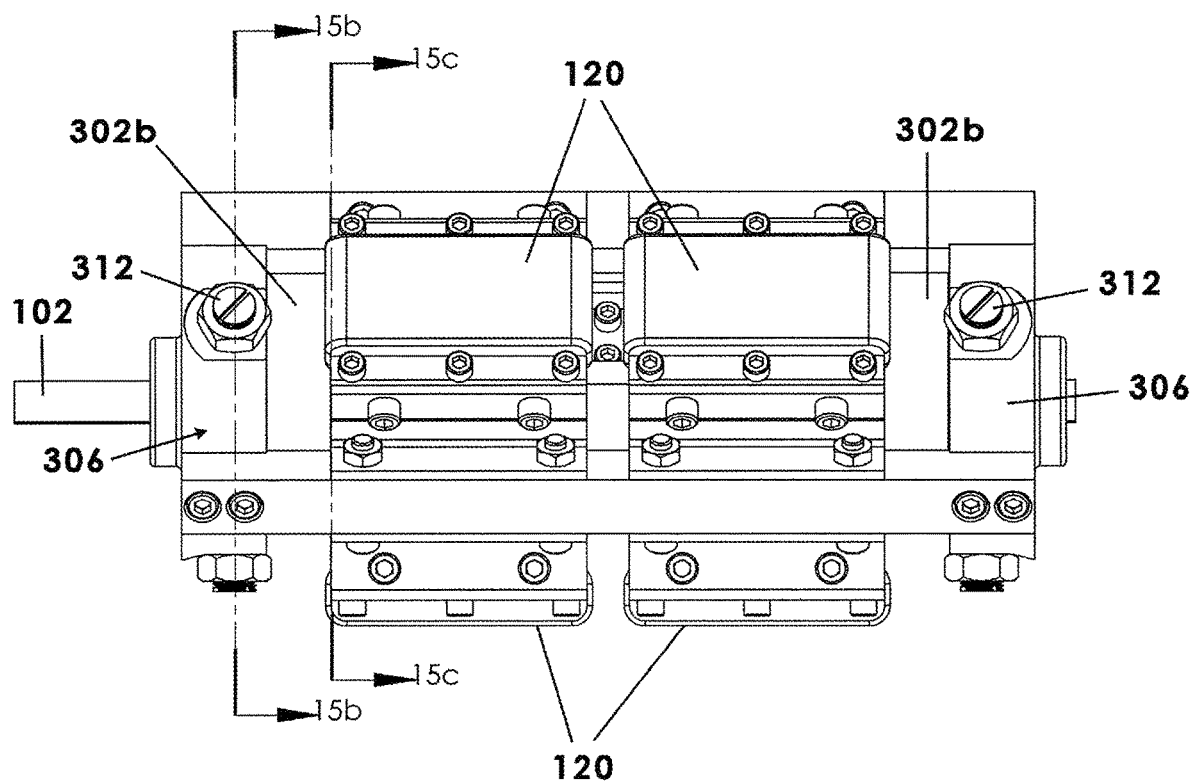
Figure 15B:
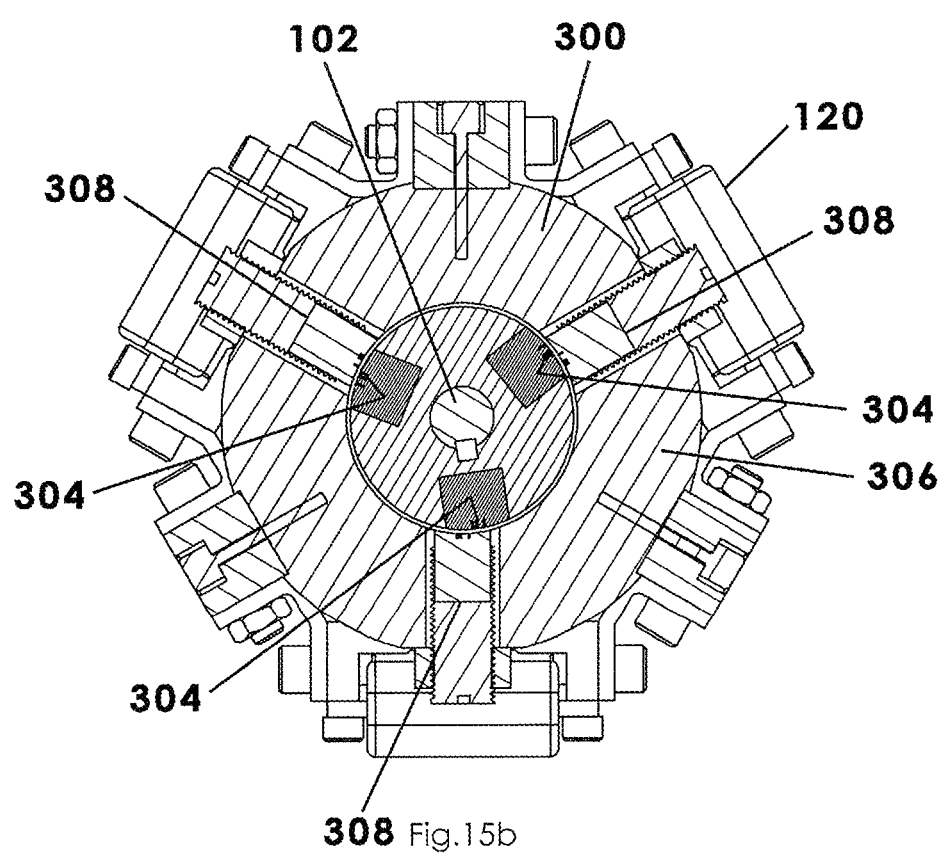

FIG. 15c depicts a generator that includes three rotor assemblies but with each rotor assembly having only a pair of rotor magnets as is indicative of half-pulse wave device. By contrast, FIG. 15d depicts a generator that includes three rotor assemblies, each rotor assembly having a set of three rotor magnets as described above and indicative of a full pulse wave device. All of the magnets are intentionally numbered using the same reference numerals indicating like construction and this is not different elements having the same reference numeral.

Figure 17:
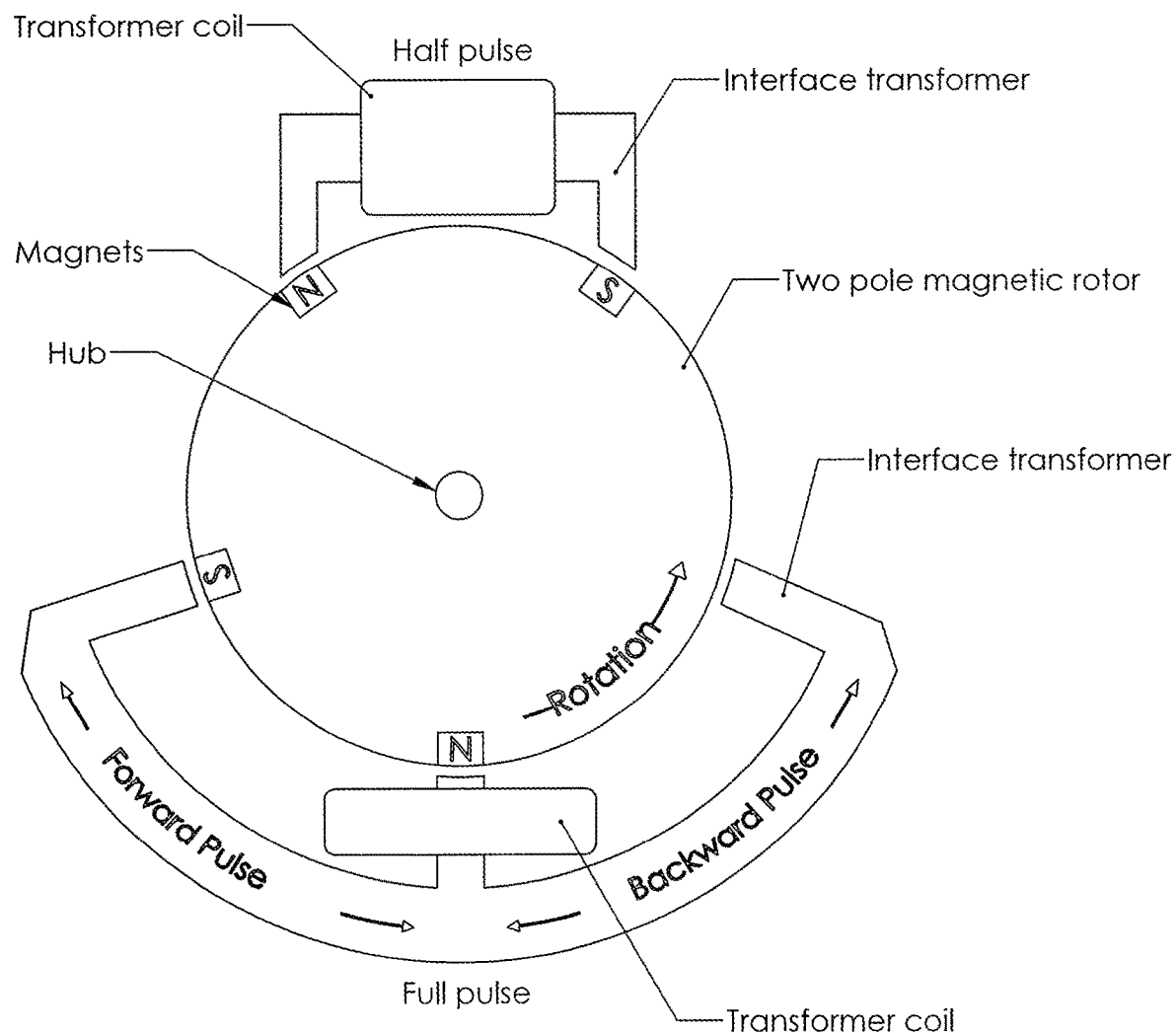
FIG. 17 is a diagrammatic view contrasting a half pulse wave and full pulse wave construction.

With reference to FIG. 17, the following is further description and contrast between a half-pulse wave and a full pulse wave and the flipping of magnetic fields.

A half-pulse wave is a one-way magnetic flux pulse that mimics half of an alternating current. The peak pulse is sharper than a full pulse wave. The half-pulse wave is almost a razor wave or shark tooth wave, which is characterized by sharp peaks whereas a full pulse wave has smooth peaks like a sine wave as contrasted in the figures.

With reference to the illustration shown in FIG. 17, half of this coil fires one-way first then the field flips in reverse on the other half of the transformer or the interface transformer. One field spins clockwise and the other field spins counterclockwise when referring to alternating current. At the magnetic or of the electrons, one gets an erratic DC poles where the magnetic field. This is a magnetic static flip field where one puts a positive against another positive, causing it to flip over to a negative field and tries to stabilize only to run into a mirror field and flips to the opposite field every time which is reactive forces that continue as long as alternating current is being generated.

When a north pole magnet faces another North pole magnet in that the closer they get to each other, one magnet flips over to make the field North and South. In other words, they balance each other. When a magnet that hits the same polarity, the field bucks or snaps against each other. This is called electron whipping. As long as the electron is in motion a chain reaction is sustained. DC or direct current is like a bulldozer. It pushes more and deeper as it goes through more wire length. This is why direct-current has to have heavy wire to transfer power at a distance. By contrast, AC power is like skipping a flat rock on water.

In an embodiment, the generator (load device 108) may include a bifurcated construction. As shown, each coil pack 120 may include a first portion and a second portion adjacent the first portion (shown but not numbered). Similarly, each rotor assembly may include twice the number of rotor magnets. In other words, each rotor assembly may include six magnets instead of three magnets as described previously. For instance, the first rotor magnet 430 may include a first magnet portion 302a and a second magnet portion 302a. Similarly, the second rotor magnet 432 may include a third magnet portion 302a and a fourth magnet portion 302a. And, the third rotor magnet 434 may include a fifth magnet portion 302a and a sixth magnet portion 302a. With further reference to FIG. 14a, the center support ring 410 may be positioned at the point of bifurcation and, as such, separate the coil pack portions.

In use, a magnetically-driven electricity-producing generator 108 having an anti-lock assembly 10 is capable of generating electricity indicative of a full pulse wave environment while creating a repulsive force that reduces the force necessary to rotate the shaft. The apparatus is modular such that the magnetically-driven electricity-producing generator may be selectively removed from the anti-lock assembly although operating a complex electricity producing generator without a means for preventing a deadlock condition is not preferred.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A magnetically-driven electric generator of a type having a rotating shaft, a framework, and at least one coil pack attached to the framework, the magnetically-driven electric generator comprising:

a pair of outer rotor assemblies opposite and displaced from one another, each of said pair of the outer rotor assemblies comprising:

an inner ring attached to the rotating shaft such that the inner ring rotates with the rotating shaft;

a first inner magnet, a second inner magnet, and a third inner magnet attached to the inner ring;

an outer ring attached to the electric generator and positioned a fixed distance from the inner ring and the rotating shaft;

a first outer magnet, a second outer magnet, and a third outer magnet attached to the outer ring;

wherein when the inner ring rotates with the rotating shaft such that like magnetic poles of each of the outer magnets exerts a repulsive force on each of the inner magnets as the inner magnets pass by the outer magnets upon rotation of the rotating shaft;

a first inner rotor assembly, a second inner rotor assembly, and a third inner rotor assembly operatively coupled to said inner ring of said each outer rotor assembly so as to rotate with the rotating shaft;

wherein each of said first, second and third inner rotor assemblies includes a first rotor magnet, a second rotor magnet, and a third rotor magnet adjacent one another and extending longitudinally between said inner rings of the pair of the outer rotor assemblies, respectively, said rotor magnets being oriented such that outwardly facing poles associated with said first and third rotor magnets have a same polarity and an outward facing pole of said second rotor magnet has an opposite polarity than said outwardly facing poles of said first and third magnets;

wherein said outwardly facing poles are a fixed distance from the at least one coil pack;

wherein when the inner ring rotates with the rotating shaft, respective outwardly facing poles of the first and second rotor magnets generate a half-pulse wave of electricity as said first and second rotor magnets pass by the at least one coil pack and such that respective outwardly facing poles of the second and third rotor magnets generate another half-pulse wave of electricity as said second and third rotor magnets pass by the at least one coil pack.

2. The magnetically-driven electric generator as in claim 1, wherein the at least one coil pack includes a first coil pack, a second coil pack, and a third coil pack, said first, second, and third coil packs extending longitudinally along said framework between said inner rings, respectively.

3. The magnetically-driven electric generator as in claim 1, wherein each said inner ring includes a magnet portion rotatably coupled to each said outer ring, respectively, and an end support ring attached to an associated inner rotor assembly, respectively.

4. The magnetically-driven electric generator as in claim 3, wherein each inner rotor assembly includes a magnet holding member defining a first slot extending longitudinally and dimensioned for receiving the first rotor magnet, a second slot extending longitudinally and dimensioned for receiving the second rotor magnet, and a third slot extending longitudinally and dimensioned for receiving the third rotor magnet.

5. The magnetically-driven electric generator as in claim 4, wherein said magnet member associated with said each inner rotor assembly is attached to a respective end support ring of a respective inner ring of a respective outer rotor assembly.

6. The magnetically-driven electric generator as in claim 1, wherein said inner rotor assemblies are positioned with 120 degrees of arc separation from the other inner rotor assemblies.

7. The magnetically-driven electric generator as in claim 4, wherein:

said inner rotor assemblies each include a bifurcated construction having a first portion and a second portion;

said first rotor magnet includes a first magnet portion situated in said first portion of said first inner rotor assembly and a second magnet portion situated in said second portion of said first inner rotor assembly;

said second rotor magnet includes a third magnet portion situated in said first portion of said first inner rotor assembly and a fourth magnet portion situated in said second portion of said first inner rotor assembly;

said third rotor magnet includes a fifth magnet portion situated in said first portion of said first inner rotor assembly and a sixth magnet portion situated in said second portion of said first inner rotor assembly.

8. The magnetically-driven electric generator as in claim 2, wherein said coil packs each include a bifurcated construction having a first coil pack portion and a second coil pack portion laterally adjacent said first coil pack portion.

9. The magnetically-driven electric generator as in claim 5, further comprising a center support ring positioned intermediate said end support rings associated with said inner rings, said center support ring being attached to said rotating shaft.

10. The magnetically-driven electric generator as in claim 1, wherein the like magnetic poles of the inner magnets and the outer magnets extend outwardly from the inner ring and inwardly from the outer ring, respectively.

11. The magnetically-driven electric generator as in claim 10, wherein the inner magnets are disposed on the inner ring with their like poles extending outwardly from the rotating shaft and with 120 degrees of arc separation from the other inner magnets.

12. The anti-lock device of claim 11, wherein the outer magnets are disposed on the outer ring with their like poles extending inwardly toward the rotating shaft and with 120 degrees of arc separation from the other outer magnets.

13. The anti-lock device of claim 12, wherein the outer magnets are aligned with the electric generator such that when one of the outer magnets repels one of the inner magnets, the repulsive force counteracts a portion of the load of the electric generator.

14. A magnetically-driven electric generator of a type having a rotating shaft, a framework, and at least one coil pack attached to the framework, the magnetically-driven electric generator comprising:

a pair of end support rings opposite and displaced from one another, said pair of end support rings being attached to the rotating shaft so as to rotate with said rotating shaft;

a framework;

a first coil pack, a second coil pack, and a third coil pack, said first, second, and third coil packs attached to said framework and extending longitudinally along said framework between said pair of end support rings, respectively; and a first inner rotor assembly, a second inner rotor assembly, and a third inner rotor assembly operatively coupled to said pair of end support rings so as to rotate with the rotating shaft;

wherein each of said first, second and third inner rotor assemblies includes a first rotor magnet, a second rotor magnet, and a third rotor magnet adjacent one another and extending longitudinally between said pair of end support rings, respectively, said rotor magnets being oriented such that outwardly facing poles associated with said first and third rotor magnets have a same polarity and an outward facing pole of said second rotor magnet, which is positioned intermediate said first and third rotor magnets, has an opposite polarity than said outwardly facing poles of said first and third magnets;

wherein said outwardly facing poles are a fixed distance from a corresponding coil pack;

wherein when the pair of end support rings rotate with the rotating shaft, respective outwardly facing poles of the first and second rotor magnets generate a half-pulse wave of electricity as said first and second rotor magnets pass by the corresponding coil pack and such that respective outwardly facing poles of the second and third rotor magnets generate another half-pulse wave of electricity as said second and third rotor magnets pass by the at least one coil pack.

15. The magnetically-driven electric generator as in claim 14, wherein each inner rotor assembly includes a magnet holding member defining a first slot extending longitudinally and dimensioned for receiving the first rotor magnet, a second slot extending longitudinally and dimensioned for receiving the second rotor magnet, and a third slot extending longitudinally and dimensioned for receiving the third rotor magnet.

16. The magnetically-driven electric generator as in claim 15, wherein said magnet member associated with said each inner rotor assembly is attached to a respective end support ring.

17. The magnetically-driven electric generator as in claim 14, wherein said inner rotor assemblies are positioned with 120 degrees of arc separation from the other inner rotor assemblies.

18. The magnetically-driven electric generator as in claim 14, wherein said coil packs each include a bifurcated construction having a first coil pack portion and a second coil pack portion laterally adjacent said first coil pack portion.

19. The magnetically-driven electric generator as in claim 14, further comprising a center support ring positioned intermediate said end support rings, said center support ring being attached to said rotating shaft.

20. The magnetically-driven electric generator as in claim 14, further comprising: a pair of outer rotor assemblies opposite and displaced from one another, each outer rotor assembly, comprising:
an inner ring attached to the rotating shaft such that the inner ring rotates with the rotating shaft, said inner ring fixedly attached to an adjacent said end support ring;
a first inner magnet, a second inner magnet, and a third inner magnet attached to the inner ring;
an outer ring attached to the electric generator and positioned a fixed distance from the inner ring and the rotating shaft;
a first outer magnet, a second outer magnet, and a third outer magnet attached to the outer ring;
wherein when the inner ring rotates with the rotating shaft such that like magnetic poles of each of the outer magnets exerts a repulsive force on each of the inner magnets as the inner magnets pass by the outer magnets upon rotation of the rotating shaft.

21. The magnetically-driven electric generator as in claim 20, wherein the like magnetic poles of the inner magnets and the outer magnets extend outwardly from the inner ring and inwardly from the outer ring, respectively.

22. The magnetically-driven electric generator as in claim 21, wherein the inner magnets are disposed on the inner ring with their like poles extending outwardly from the rotating shaft and with 120 degrees of arc separation from the other inner magnets.

23. The magnetically-driven electric generator as in claim 22, wherein the outer magnets are disposed on the outer ring with their like poles extending inwardly toward the rotating shaft and with 120 degrees of arc separation from the other outer magnets.

24. The magnetically-driven electric generator as in claim 23, wherein the outer magnets are aligned such that when one of the outer magnets repels one of the inner magnets, the repulsive force counteracts a portion of a load of the inner rotor assemblies.

* * * * *